June 9, 1942. J. A. OBEROSLER 2,285,828
PISTON RING TOOL
Filed June 11, 1941 2 Sheets-Sheet 2

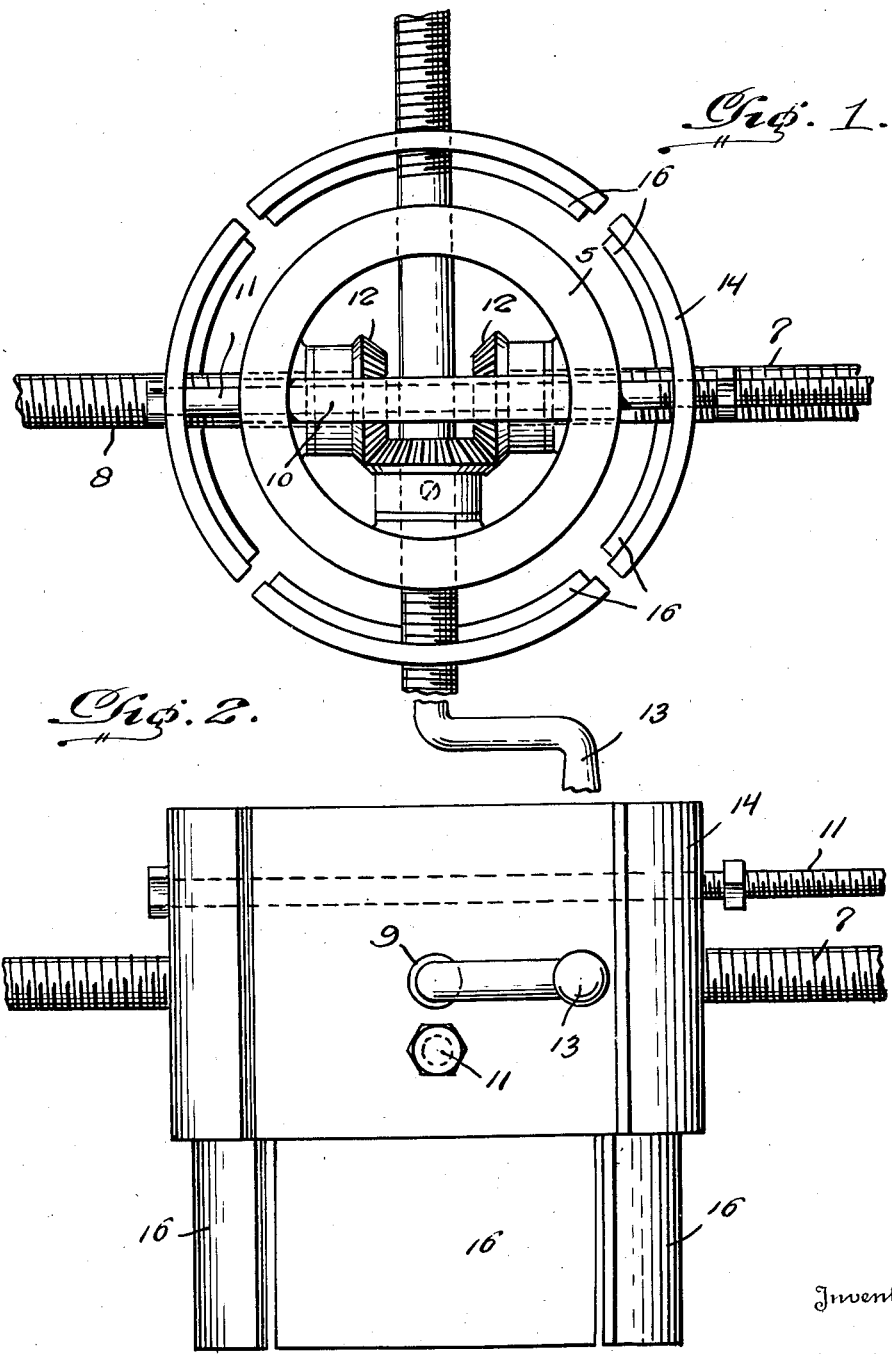

Inventor
Joseph A. Oberosler

Patented June 9, 1942

2,285,828

UNITED STATES PATENT OFFICE 2,285,828

PISTON RING TOOL

Joseph A. Oberosler, Central City, Colo.

Application June 11, 1941, Serial No. 397,631

1 Claim. (Cl. 29—86.4)

This invention relates to a piston ring tool, and has for the primary object the provision of a durable and compact device of the above stated character which will permit piston rings ranging in different sizes to be easily and quickly expanded and contracted and consists of a minimum number of parts for the economical manufacture and maintenance thereof.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a top plan view illustrating a piston ring tool constructed in accordance with my invention.

Figure 2 is a side elevation illustrating the same.

Figure 3:
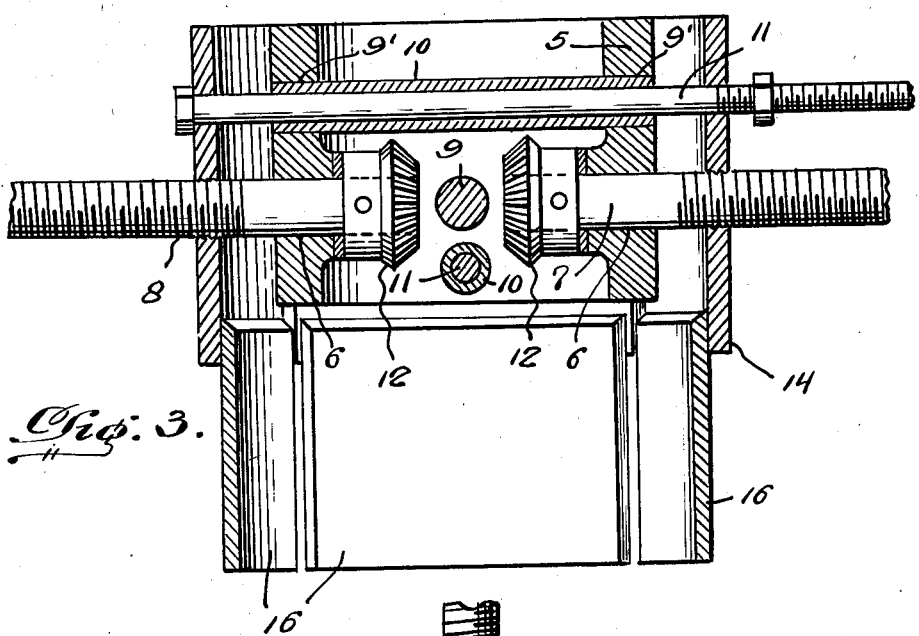
Figure 3 is a vertical sectional view illustrating the device.
Figure 4:
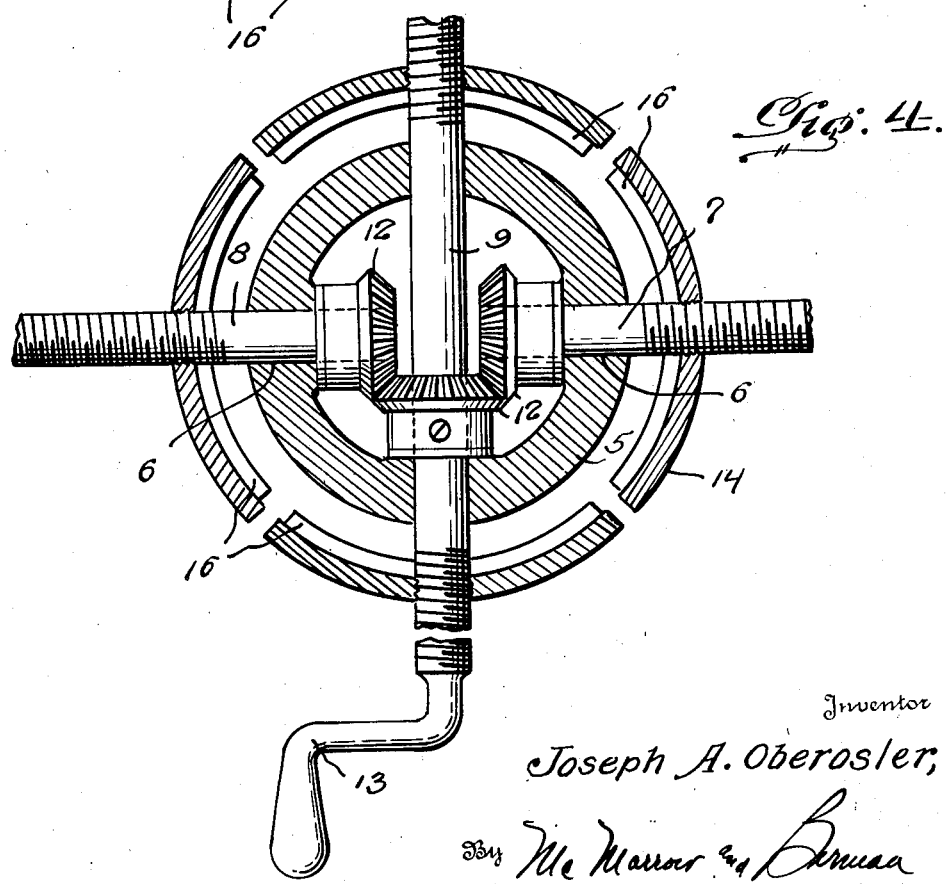
Figure 4 is a horizontal sectional view illustrating the device.

Referring in detail to the drawings, the numeral 5 indicates an annular body having therein equally spaced bearing openings 6 for rotatably supporting feed shafts 7, 8 and 9 and also is provided with equally spaced openings 9' to receive sleeves 10 arranged above and below the openings 6 for the support of guide rods 11 in the form of tie bolts. The feed shafts 7, 8 and 9 are geared together, as shown at 12, and one end of the feed shaft 9 is in the form of a crank handle 13. The shaft 9 has thereon right and left feed threads while the shafts 7 and 8 are each provided with right hand threads.

A cylindrical shell 14 surrounds the body 5 and is slidably mounted on the guide rods 11 and is composed of sections arranged in opposed pairs and one of the opposed pairs of sections has screw threaded openings to match and receive the right and left hand feed threads of the shaft 9 while the other pair of opposed sections have screw threaded openings to match and receive the feed threads of the shafts 7 and 8 so that when the crank handle is rotated in one direction the sections of the shell will be caused to move away from the body 5 and when the crank handle is rotated in an opposite direction will be caused to move toward the body.

The sectional shell 14 includes ring engaging portions 16 forming continuations of the sections or may be constructed separately therefrom and suitable secured thereon so as to project beyond one end of the body 5 to engage piston rings of varying diameters for the expansion and contraction of said rings by the rotation of the shafts 9 in opposite directions.

Thus it will be seen that the ring engaging portions may be easily inserted within a ring for the expansion thereof or have a ring placed therein for the contraction thereof. Also, it will be seen through the use of the ring engaging portions it will permit an expanded or contracted ring to be easily and quickly assembled on or within a device to which the ring is adapted.

While I have shown and described the preferred embodiment of my invention, it will be understood that minor changes in construction, combination and arrangement of parts may be made without departing from the spirit and scope of the invention as claimed.

Having thus described the invention, what I claim is:

In a piston ring tool, an annular hollow body, a cylindrical shaped sectional shell composed of a plurality of arcuate sections positioned about said body and projecting beyond one end thereof, said sections including portions extending beyond said projecting end and axially of said shell to engage a piston ring for the expansion and contraction thereof, guide rods arranged at right angles to each other and one above the other and carried by the body and slidably supporting, at each end, opposed sections of the shell and limiting the distance of travel of the sections away from the body, feed shafts journaled in said body between the guide rods and having threaded connections with the sections, gearing interconnecting said shafts for simultaneous actuation, said gearing being located within the body, and a crank handle formed on one of the shafts for the simultaneous operation of said shafts and, through the threaded connection with said arcuate sections, for simultaneous adjustment of the sections toward and from the body.

JOSEPH A. OBEROSLER.